Patented Nov. 15, 1927.

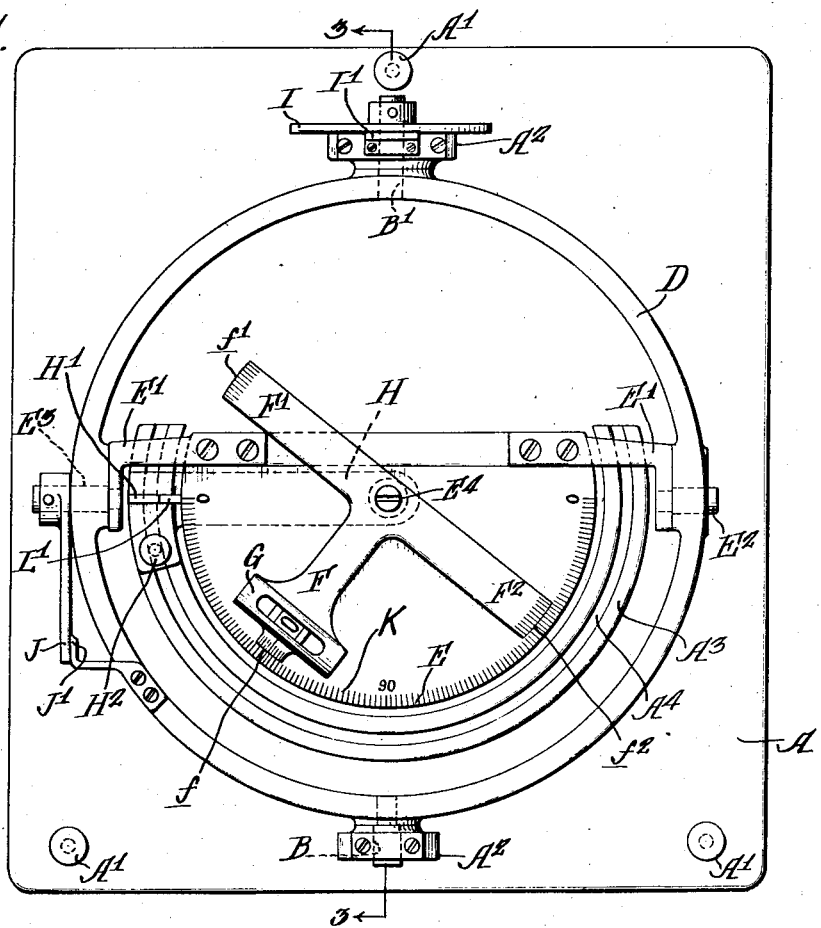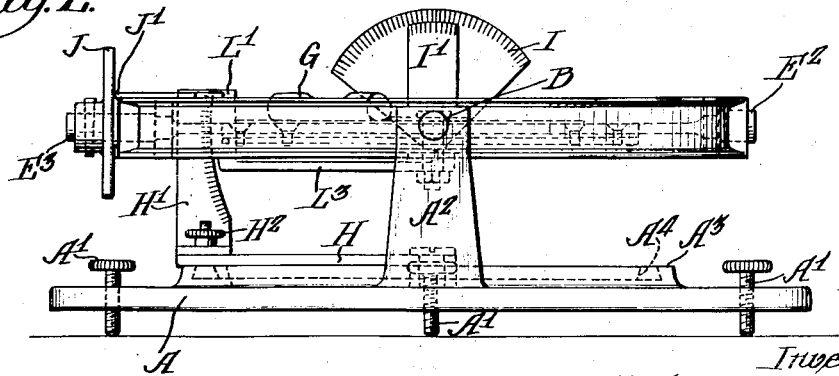

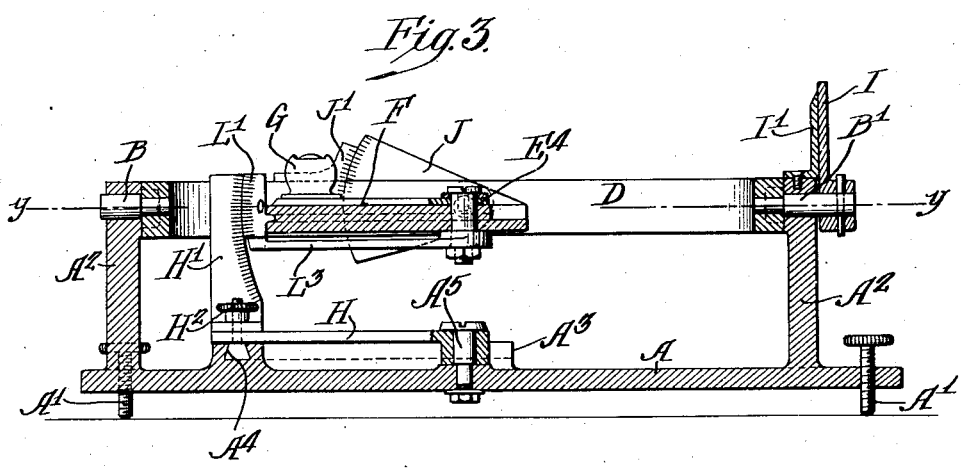
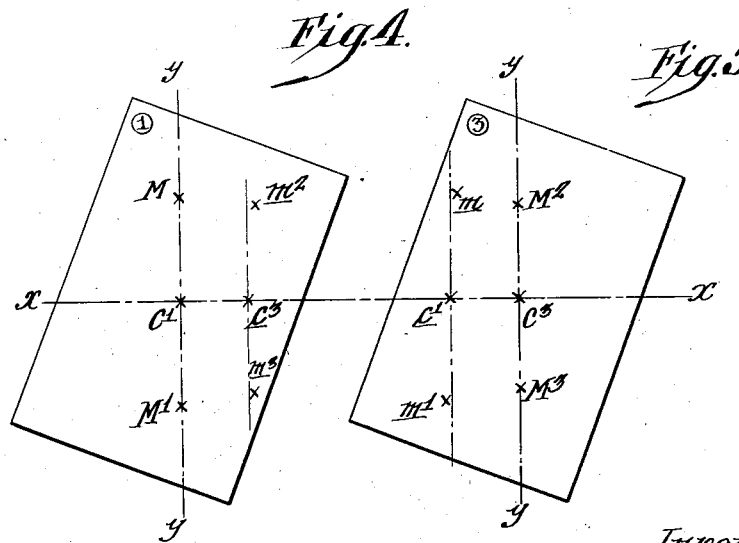

1,649,406

UNITED STATES PATENT OFFICE.

LODEWYK J. R. HOLST, OF BROOKLINE, PENNSYLVANIA, ASSIGNOR TO BROCK & WEYMOUTH, INCORPORATED, OF PHILADELPHIA, PENNSYLVANIA, A CORPORATION OF DELAWARE.

RESULTANT-TILT FINDER.

Application filed September 1, 1925, Serial No. 53,778. Renewed October 8, 1927.

In Patent Number 1,565,413 of Arthur Brock, Jr. and Lodewyk J. R. Holst, Dec. 15, 1925, a method of making maps from a series of overlapping photographs is described, which involves a determination of the tilt from a horizontal plane of the photographic plates with reference to two axes, one corresponding to the line of flight of the aeroplane from which the photographs are taken and the other corresponding to a line at right angles to the first axis and passing through the center point of the plate. From the data thus obtained the true axis of tilt and the magnitude of the angle of tilt can be determined, and the plates reprojected to provide plates corresponding to a horizontal projection.

The object of my invention is to provide a machine by the use of which the true axis and angle of tilt can be easily and promptly determined.

The nature of my invention will be best understood as described in connection with the drawings, which illustrate a machine embodying my invention, and in which Figure 1 is a plan view of the machine;

Figure 2 a front elevation;

Figure 3 a vertical section on line 3—3 of Figure 1; and

Figures 4 and 5 are diagrammatic views of a stereoscopic pair of photographic plates arranged so that the line corresponding to the line of flight of the aeroplane from which they were taken passes through the center and conjugate center points of both plates.

A is the base plate provided with levelling screws $A^1$; standards $A^2$, $A^2$; a segmental guideway $A^3$ having an undercut slot $A^4$ and a pivot pin $A^5$.

B and $B^1$ are pivot pins having bearings in the standards $A^2$ and secured to a gimbal ring D. E is a platen constituted of a disk segment of more than 180° and supported by means of arms $E^1$, $E^1$, pivot pins $E^2$, $E^3$, which have their bearings in the ring D in a line running at right angles to the line of the pivots B, $B^1$, the two lines intersecting at the center of the ring. $E^4$ is a pivot pin extending on both sides of the platen at the center of the gimbal ring. F, $F^1$, $F^2$ is a three armed lever pivoted on pin $E^4$ and having verniers $f^1$, $f^2$ and $f$ at the ends of the arms which register with the protractor K formed on the edges of the platen. G is a spirit level secured on arm F which shows level when the platen is in horizontal position. H is an arm pivoted on pin $A^5$ directly below pivot $E^4$ and carrying a protractor $H^1$ and a clamping screw $H^2$. I is a protractor secured to pivot pin $B^1$ and registering with a vernier $I^1$ screwed on standard $A^2$. J is a protractor secured to pivot pin $E^3$ and registering with a vernier $J^1$ attached to gimbal ring D. $L^3$ is an arm pivoted on the lower end of pin $E^4$ and carrying a vernier $L^1$ which registers with protractor $H^1$.

In Fig. 4 the pair of plates indicated at (1) and (3) have indicated at $C^1$ and $C^3$ the center points of the views and at $c^1$ and $c^3$, the conjugate center points as they appear on the plates. The flying line $x$—$x$ passing through these points may be taken as one tilt axis and lines $y$—$y$ passing through the center of each plate and at right angles to line $x$—$x$ is the other tilt axis. M and $M^1$ are points in plate (1) lying in or near axis $y$—$y$ and $M^2$, $M^3$ points in plate (3) lying in or near the tilt axis $y$—$y$ of that plate. $m$, $m^1$, $m^2$ and $m^3$ are the conjugates of these points as they appear in the other plate.

My machine is intended to ascertain the true axis and angle of tilt of the plates after the direction of tilt and angle of tilt of the plates on the selected axes $x$—$x$ and $y$—$y$ have been ascertained. To do this the gimbal ring D is tilted to the horizontal to the angle of tilt on axis $x$—$x$, the platen is tilted in the gimbal ring to the angle of tilt determined as existing on the $y$—$y$ axis. The three armed lever F, $F^1$, $F^2$ is then turned until the spirit level G shows level and the angle measured on the protractor K. This determines the true axis of tilt and the tilt angle on this axis is measured on protractor $H'$ by vernier $L^1$ after the protractor and vernier have been swung into alignment with arm F. The true axis and angle of tilt having been thus ascertained and the axis indicated on each plate, the described reprojection of the plates is easily effected.

Having now described my invention, what I claim as new and desire to secure by Letters Patent, is:

1. Means for ascertaining the true tilt axis of a photographic plate, the tilt of which on two arbitrarily selected axes is known, comprising in combination a base, a gimbal ring pivotally supported thereon, a platen pivotally supported on the gimbal to tilt at right angles to the tilt of the gimbal, a protractor and vernier for measuring the tilt of the gimbal from a horizontal plane, a protractor and vernier for measuring the tilt of the platen from the plane of the gimbal, means for determining the true axis of tilt of the platen in any position it occupies consisting of an arm pivoted on the platen at a point lying in the line where vertical planes passing through the tile axis of the gimbal and platen intersect, and carrying a spirit level and a protractor and vernier for measuring the tilt on said true axis.

2. Means for ascertaining the true tilt axis of a photographic plate the tilt of which on two arbitrarily selected axes is known, comprising in combination a base, a gimbal ring pivotally supported thereon, a platen pivotally supported on the gimbal to tilt at right angles to the tilt of the gimbal, a protractor and vernier for measuring the tilt of the gimbal from a horizontal plane, a protractor and vernier for measuring the tilt of the platen from the plane of the gimbal, means for determining the true axis of tilt of the platen in any position it occupies, consisting of a arm pivoted on the platen at a point lying in the line where vertical planes passing through the tilt axis of the gimbal and platen intersect, and carrying a spirit level, a protractor and vernier for measuring the angular deviation of said true axis of tilt from the tilt axis of the platen and a protractor and vernier for measuring the tilt on said true axis.

LODEWYK J. R. HOLST.